(12) United States Patent
Everett et al.

(10) Patent No.: US 8,036,609 B2
(45) Date of Patent: Oct. 11, 2011

(54) FM TRANSMITTER FOR AN MP PLAYER

(75) Inventors: Rusty Everett, El Dorado Hills, CA (US); Yasuhiro Yamamoto, San Francisco, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 1199 days.

(21) Appl. No.: 11/002,044

(22) Filed: Dec. 1, 2004

(65) Prior Publication Data
US 2005/0123147 A1 Jun. 9, 2005

Related U.S. Application Data

(60) Provisional application No. 60/527,202, filed on Dec. 5, 2003.

(51) Int. Cl.
*H04B 1/034* (2006.01)

(52) U.S. Cl. ........... 455/99; 455/103; 455/575; 455/568

(58) Field of Classification Search .................. 455/99
See application file for complete search history.

(56) References Cited

U.S. PATENT DOCUMENTS

| | | |
|---|---|---|
| 4,712,250 A | 12/1987 | Michaels et al. |
| 5,319,716 A | 6/1994 | McGreevy |
| 5,448,757 A | 9/1995 | Hirata |
| 5,491,839 A | 2/1996 | Schotz |
| 5,771,441 A | 6/1998 | Alstatt |
| 5,867,794 A | 2/1999 | Hayes et al. |
| 5,970,390 A | 10/1999 | Koga et al. |
| 6,023,616 A | 2/2000 | Briskman |
| 6,163,711 A | 12/2000 | Juntunen et al. |
| 6,272,328 B1 | 8/2001 | Nguyen et al. |
| 6,493,546 B2 | 12/2002 | Patsiokas |
| 6,591,085 B1 | 7/2003 | Grady |
| 6,636,749 B2 | 10/2003 | Holmes et al. |
| 6,671,494 B1 | 12/2003 | James |
| 6,782,239 B2 | 8/2004 | Johnson et al. |
| 6,810,233 B2 | 10/2004 | Patiokas |
| 7,062,238 B2 | 6/2006 | Glaza |
| 7,082,203 B1 | 7/2006 | Drakoulis et al. |

(Continued)

FOREIGN PATENT DOCUMENTS

GB       2 330 487 A       4/1999

(Continued)

OTHER PUBLICATIONS

"Installation and Operation Instructions for the DLO TransPod™," Netalog, Inc., 2 pages.

(Continued)

*Primary Examiner* — Duc Nguyen
*Assistant Examiner* — Ajibola Akinyemi
(74) *Attorney, Agent, or Firm* — LaRiviere, Grubman & Payne, LLP

(57) ABSTRACT

A device for connecting a personal audio/video player to a vehicle equipped with a FM radio. The device connects to the lighter/DC connector of the vehicle with a power block 1 to provide a source of power for the player and recharges the internal battery of the player. The device also connects to docking receptacles of a personal audio player with a receive port 6 allowing unattenuated sound and recharging connection. A wire 4 serves as an antenna for a FM transmitter 3 to make a wireless connection to the vehicle radio.

13 Claims, 3 Drawing Sheets

U.S. PATENT DOCUMENTS

| | | |
|---|---|---|
| 2002/0058475 A1 | 5/2002 | Patsiokas |
| 2002/0198031 A1 | 12/2002 | Holmes et al. |
| 2003/0026439 A1 | 2/2003 | Yamamoto |
| 2003/0036357 A1 | 2/2003 | McGowan |
| 2003/0083024 A1* | 5/2003 | Richenstein et al. ............ 455/99 |
| 2003/0236075 A1 | 12/2003 | Johnson et al. |
| 2004/0038716 A1 | 2/2004 | Gass |
| 2004/0058649 A1 | 3/2004 | Grady |
| 2004/0117442 A1 | 6/2004 | Thielen |
| 2005/0014536 A1* | 1/2005 | Grady ........................... 455/573 |
| 2005/0047071 A1* | 3/2005 | Tse Chun Hin ............... 361/683 |
| 2005/0049009 A1 | 3/2005 | Yamamoto |
| 2005/0123147 A1 | 6/2005 | Everett et al. |
| 2005/0249357 A1 | 11/2005 | Schedivy |
| 2005/0282498 A1 | 12/2005 | Chen |
| 2006/0205349 A1 | 9/2006 | Passier et al. |
| 2006/0223467 A1 | 10/2006 | Mason |

FOREIGN PATENT DOCUMENTS

| | | |
|---|---|---|
| JP | 06 309854 A | 11/1994 |
| JP | 09 021649 A | 1/1997 |
| WO | WO 95/33319 A | 12/1995 |
| WO | WO 97/38496 | 10/1997 |
| WO | WO 00/52984 A | 9/2000 |
| WO | WO 03/010943 | 2/2003 |

OTHER PUBLICATIONS

"About TransPod for iPod," DevDepot, Apr. 10, 2003, 2 pages.
"1070-POD—Griffin Powerpod—iPod Car Adapter/Charger," Ahern, Apr. 10, 2003, 2 paages.
"FM Transmitter for iPod," ClubMac—The Online Mac Catalog, Mar. 7, 2003, 1 page.
"iPod Accesories," DevDepot, Apr. 10, 2004, 3 pages.
"All About iPod Cnnection Kit w/FM Transmitter," DevDepot, Apr. 10, 2003, 2 pages.

* cited by examiner

FM TRANSMITTER FOR AN MP PLAYER

RELATED APPLICATION

This application claims priority based upon U.S. Provisional Patent Application Ser. No. 60/527,202, filed on Dec. 5, 2003.

TECHNICAL FIELD

This invention is directed to a wireless audio FM transmitter for a digital audio player such as an MP3 player. In particular, the present invention relates to a wireless audio FM transmitter for a digital audio player that allows reception by a standard FM radio of a transmitted signal from the digital audio player. The FM transmitter for the digital audio player comprises a channel selector for selection of an available FM radio station, a transmitter, an antenna and a power adapter for supplying power to the digital audio player and charging the battery or batteries of a digital audio player while connected to a vehicle cigarette lighter or accessory socket.

BACKGROUND ART

Presently, personal digital audio players are portable standalone units that allow a user to enjoy digital quality music with headphones or portable speakers. Many such players have hard disk drives which allow a user's entire music collection to be stored on a pocket-sized device. The most popular such device is the Apple iPod produced by Apple Computer, Inc. of Cupertino, Calif. Many users of iPods and similar devices have a desire to listen to the digital audio player recorded music, while driving in an automobile. It can be dangerous to listen to headphones while driving and an alternative would be to use a standard FM radio so that the automobile speaker system is utilized to listen to high quality digital music. Only the most expensive car radios have accessible inputs which accept the digital audio players input. In older car radios with cassette tape players, adapters are sometimes used which fool the player into thinking a tape is in the cassette slot. In the slot is a small recoding head which makes a magnetic connection to the tape players play head. Such devices sacrifice play quality, battery life, and are problematic as most newer car radios have CD players and no tape slot. As such, there is a need for an apparatus that can receive audio signals from the digital audio player and transmit these signals through a standard FM radio. If a FM transmitter is connected to an iPod, for example, the iPod's internal battery can be drained quite quickly and require their own battery. Conventional FM transmitters and tape adapters typically connect to the headphone jack and remote control plug of an iPod or similar player. The headphone jack is subject to the players internal attenuation circuitry which may degrade sound quality. This connection is also incapable of providing power to the unit and the capability of recharging the player's internal battery. It is thus desirable to provide other advantages such as providing power for the digital audio player, and allow a user to select an available FM station and recharge the battery or batteries of an MP3 player while connected to a vehicle cigarette lighter or accessory plug.

DISCLOSURE OF THE INVENTION

The present invention addresses the need for a system allowing persons to connect a digital audio player to an automobile radio. The invention further provides a source of power for the player and recharges the internal battery of the player. The invention connects to the docking plug of an iPod, which allows unattenuated sound and an excellent audio and recharging connection.

BRIEF DESCRIPTION OF THE DRAWINGS

For a better understanding of the present invention, reference is made to the below referenced accompanying drawings. Reference numbers refer to the same or equivalent parts of the present invention throughout the several figures of the drawings.

BEST MODES FOR CARRYING OUT THE INVENTION

Figure 1:
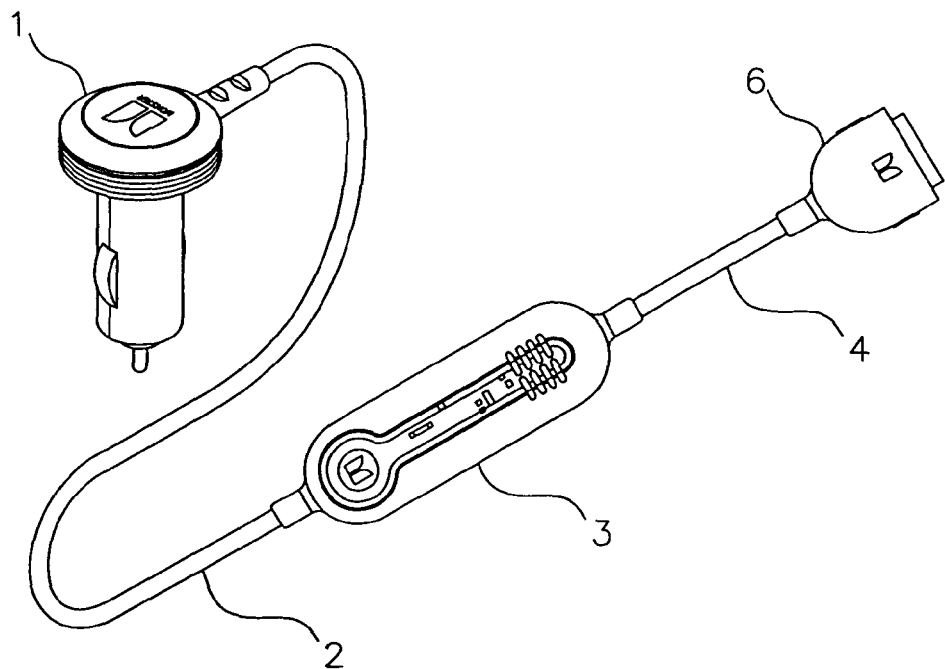
FIG. 1 is a perspective view of the apparatus of the intention.

FIG. 1 is a perspective view of the apparatus of the invention. This embodiment includes a power block portion 1 insertable into a vehicle lighter/DC receptacle. A length of cord 2 connects power block 1 to a FM transmitter 3. In the preferred embodiment, cord 2 is a two-conductor cord 26 inches in length. FM transmitter 3 has been designed to receive audio signals from a standard MP3 player such as an iPod, and transmit these audio signals to a standard FM radio. A second cord 4 connects FM transmitter 3 to a docking plug 6. In the preferred embodiment, cord 4 is a five-conductor cord 8 inches in length. Cord 4 further serves as the antenna for FM transmitter 3. Docking plug 6 connects to an iPod in the preferred embodiment and allows unattenuated audio signals to pass to FM transmitter 3 as well as filtered DC current to pass from the vehicle to any device connected to docking plug 6. By changing the connection on docking plug 6, players other than an iPod could be used.

Figure 2:
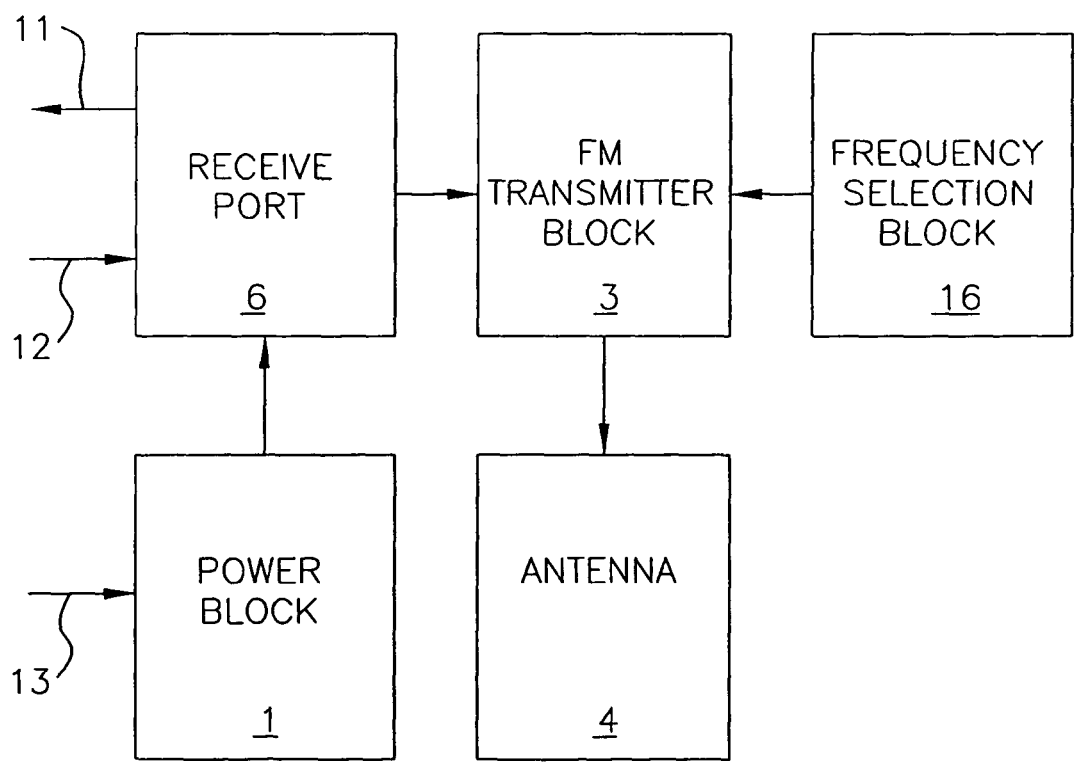
FIG. 2 is a block diagram of the circuit of the FIG. 1 embodiment.

FIG. 2 is a block diagram of the circuit of the FIG. 1 embodiment. This embodiment includes docking plug 6 also called a receive port which receives an input 11 from an iPod or other player which in turn receives DC current from an output 12. The receive port transmits a signal to a FM Transmitter 3 which uses the audio signal to modulate the frequency of the transmitter to a frequency on the FM broadcast band. A frequency selection block 16 connected to FM transmitter 3 selects an appropriate frequency for FM transmitter 3. An antenna which may include cable 4 receives and broadcasts the modulated FM signal from FM transmitter 3. Finally, a power module block 1 connects to a source 13 of DC power such as a vehicle lighter/DC Power receptacle.

Figure 3:
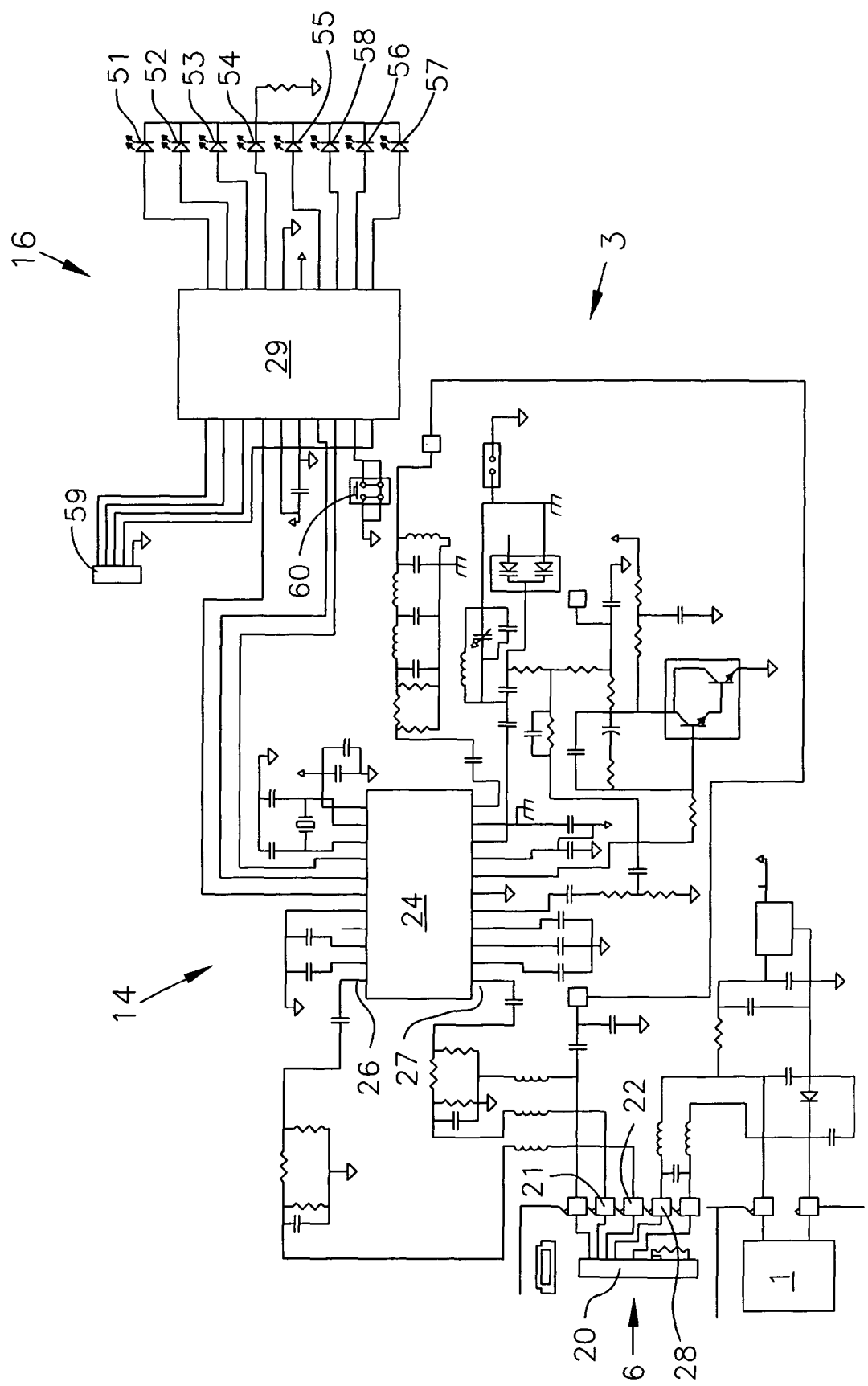
FIG. 3 is a schematic diagram of the electrical circuit of the FIG. 1 embodiment.

FIG. 3 is a schematic diagram of the electrical circuit of the FIG. 1 embodiment. At the receive port 6, a standard MP3 player (not shown in the Figure) electrically connects to IPOD2 conn port 20 which receives on pins 21 and 22, right and left channel audio signals respectively, from the standard MP3 player (not shown). The right and the left channel audio signals are electrically connected to the transmitter block 14. In particular, the transmitter block 14 includes a transmitter integrated circuit 24, a suitable chip for integrated circuit chip is a Rohm model number BH1415F. IC 24 receives the audio signals at pins 26 and 27. IC 24 modulates the frequency from the frequency selection block 16 to a FM radio frequency in accordance with right and the left channel audio signals at pins 26 and 27 depending on the electrical inputs received from the player (not shown). Power module 1 connects to pin 28 on the iPod to provide +12 volts from the cigarette lighter or accessory outlet. This power is used to provide power to the player (not shown) and allows both normal operation and the ability to recharge the battery or batteries contained within the player (not shown).

Frequency selection block 16 includes a programmable gate array 29, light-emitting diodes (LED) 51-58 and a programming input through connector 59. Programmable gate array 29 functions as a frequency adjustment mechanism allowing a user to adjust the frequency of the transmitter circuit 24 in discrete intervals. In particular, a user inputs values through connector 59 to enable the programmable gate array 29 to choose a desired FM frequency. Programmable gate array 29 can be set to select one of eight frequency channels. In this embodiment, the FM frequencies chosen are 88.1, 88.3, 88.5, 88.7, 88.9, 89.1, 89.3, and 89.5 MHz. LED 51-58 indicate which frequency channel is chosen by a user with a LED assigned to each frequency with the selected frequency being lit. If the user is in another country where FM frequencies are different than above, such as France or Germany, connector 59 provides the user a method to change the desired FM frequency to allowing FM transmitter 3 to be used in countries with different FM frequencies. Switch 60 connects to programmable gate array 29 to allow a user to toggle among the eight frequency channels. An additional feature of this embodiment is that programmable gate array 29 remembers which of the eight frequency channels was last chosen without the need for a user to again switch to the desired frequency channel.

Figure 4:
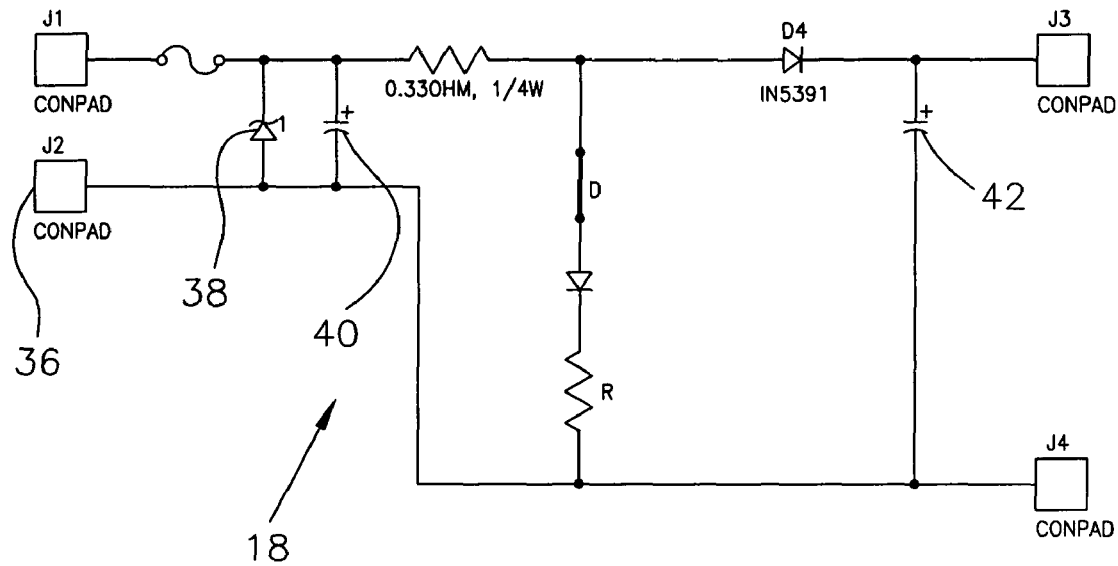
FIG. 4 is a schematic diagram of the electrical circuit of the power module block of the FIG. 1 embodiment.

FIG. 4 is a schematic diagram of the electrical circuit of the power module block 1 portion of the FIG. 1 embodiment. A vehicle cigarette lighter or accessory outlet (not shown in the Figure) connects to pins 34 and 36 for electrical power flow through a parallel connected diode 38 and a capacitor 40, and a debouncing capacitor 42 to power the FM transmitter 3. In the prior art, any FM transmitter was powered by a battery or batteries which needed to be regularly replaced. In this invention, this problem is eliminated because the FM transmitter 3 has its own power source from the vehicle cigarette lighter (not shown in the Figure) or accessory outlet (not shown in the Figure). In addition, the antenna 13 is an 8-inch straight section of wire to FM transmitter 3. As such, the same electrical connection to the player acts as an antenna 13 to transmit FM signals from the transmitter circuit 24 to a standard FM radio.

Figure 5:
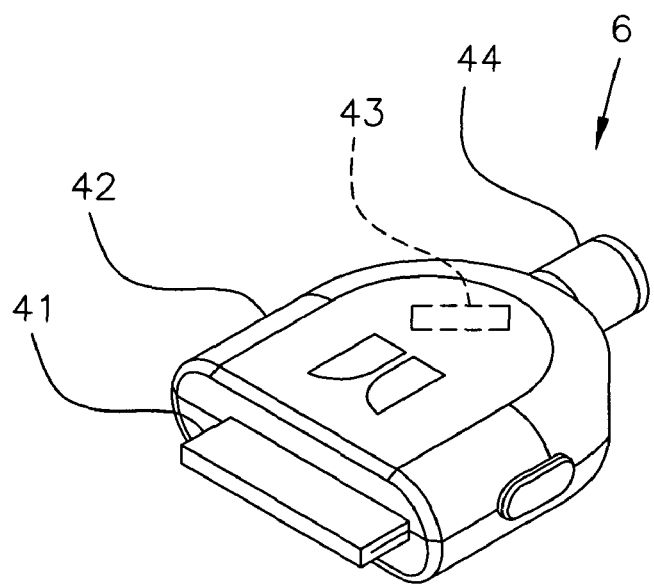
FIG. 5 is a perspective view of the receive port portion of the FIG. 1 embodiment.

FIG. 5 is a view of the docking (receive) port for a personal audio/video player. Port 6 connects to an Apple iPod in this embodiment, although other players could be used with other connections. Port 6 includes a 30 pin connector 41 in a shell 42. Pins 20 AD and 30 GND of connector 41 are connected to one side of a 1000 ohm ⅛ watt resistor 43 also in shell 42 the other end of which is connected to pin 10 AJD of connector 41. Pin 29 of connector 41 is connected to AGND, Pin 28 of connector 41 to the right channel, pin 27 of connector 41 to the left channel Pin 11 of connector 41 to power and pin 1 to ground. The above pins are connected to an 8-inch straight section of cord 44 which functions as antenna 13 and to transmitter module 3 as described above.

Information as herein shown and described in detail is fully capable of attaining the above-described object of the invention, and is, thus, representative of the subject matter which is broadly contemplated by the present invention. The scope of the present invention fully encompasses other embodiments which become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication detail can be made without departing from the spirit and scope of the inventions as set forth in the appended claims should be readily apparent to those of ordinary skill in the art. No claim herein is to be construed under the provisions of 35 U.S.C. §112, sixth paragraph, unless the element is expressly recited using the phrase "means for."

INDUSTRIAL APPLICABILITY

The present invention applies industrially to sound reproduction systems and methods. More particularly, the present invention applies industrially to vehicle audio video systems. Even more particularly, the present invention applies industrially to vehicle audio video systems and methods and apparatus to connect to and recharge portable audio players to such systems and vehicles.

What is claimed:

1. A wireless transmitter for a personal audio/video player for transmitting signals to a radio comprising: a receive port adapted for connection to a personal player; a transmitter connected to said receive port; a power module adapted for insertion into a lighter/DC port connected to said transmitter to provide power to the transmitter and to the personal player; a cable, coupled to said receive port, for receiving signals from said personal player, for conducting DC power to the personal player, and for acting as an antenna to wirelessly transmit said received signals to the radio.

2. A wireless transmitter as recited in claim 1, wherein a battery of a personal player connected to said receive port is recharged when said power module is receiving power.

3. A wireless transmitter as recited in claim 1, further comprising a channel selector.

4. A wireless transmitter as recited in claim 3, wherein said channel selector allows selection of FM frequencies on a broadcast FM band.

5. A wireless transmitter as recited in claim 4, wherein said channel selector further comprises a user switch.

6. A wireless transmitter as recited in claim 4, wherein said channel selector is programmable allowing operation on different broadcast FM bands.

7. A wireless transmitter as recited in claim 4, wherein said channel selector further comprises a plurality of LED's for indicating the channel selected.

8. A wireless transmitter as recited in claim 1, wherein said receive port is adapted for connection to an Apple iPod.

9. A wireless transmitter for a personal audio/video player for transmitting signals to a radio comprising: a receive port adapted for connection to a personal player; a cable that couples to said receive port for receiving signals of a personal player for acting as an antenna to wirelessly transmit said received signals from the personal player to a radio band; a FM transmitter connected to said receive port; a programmable channel selector with a user switch connected to said transmitter allowing selection of different FM frequencies on different broadcast FM bands and a plurality of LED's for indicating the channel selected; and a power module adapted for insertion into a lighter/DC port connected to said transmitter to the personal player to provide power to the transmitter and the personal player wherein a battery of a personal player connected to said receiver port is recharged when said power module is receiving power.

10. A method for transmitting a signal from a battery powered personal audio/video player to a radio, said method comprising the steps of:
  connecting a transmitter to a source of DC power for powering the transmitter and for conducting power to the personal player; and
  connecting a cable between the transmitter and the personal player for conducting power to the personal player, for receiving the signal from the personal player, and for acting as an antenna for wirelessly transmitting the received signal to the radio.

11. A method for transmitting a signal from a personal audio/video player to a vehicle radio as in claim 10, comprising the further step of recharging the battery in said personal player with the lighter/DC power receptacle connected to the transmitter.

12. A method for transmitting a signal from a personal audio/video player to a vehicle radio as in claim 10, comprising the further step of displaying the frequency of the transmitter.

13. A method for transmitting a signal from a personal audio/video player to a radio as in claim 10, comprising the further step of radiating electromagnetic energy received from the transmitter from a wire connecting said transmitter to the personal player.

\* \* \* \* \*

UNITED STATES PATENT AND TRADEMARK OFFICE
CERTIFICATE OF CORRECTION

| | | |
|---|---|---|
| PATENT NO. | : 8,036,609 B2 | Page 1 of 1 |
| APPLICATION NO. | : 11/002044 | |
| DATED | : October 11, 2011 | |
| INVENTOR(S) | : Rusty Everett and Yasuhiro Yamamoto et al. | |

It is certified that error appears in the above-identified patent and that said Letters Patent is hereby corrected as shown below:

On the Title Page, Item (54) and Col. 1, line 1
In the Title:
  Please correct the title from "FM Transmitter for an MP Player" to read
  --FM Transmitter for an MP3 Player--.

Signed and Sealed this
Tenth Day of January, 2012

David J. Kappos
*Director of the United States Patent and Trademark Office*